(12) United States Patent
Lee et al.

(10) Patent No.: US 7,504,005 B2
(45) Date of Patent: Mar. 17, 2009

(54) FLUID DISTILLATION APPARATUS HAVING IMPROVED EFFICIENCY

(75) Inventors: Naisin Lee, Los Altos, CA (US); Stephen F. Sporer, Berkeley, CA (US)

(73) Assignee: Lang Chou, San Jose, CA (US)

( * ) Notice: Subject to any disclaimer, the term of this patent is extended or adjusted under 35 U.S.C. 154(b) by 50 days.

(21) Appl. No.: 11/280,078

(22) Filed: Nov. 15, 2005

(65) Prior Publication Data

US 2007/0108038 A1    May 17, 2007

(51) Int. Cl.
*B01D 3/02* (2006.01)
*C02F 1/04* (2006.01)

(52) U.S. Cl. .................. 203/10; 159/16.1; 203/22; 203/27; 203/49; 203/DIG. 8; 203/DIG. 9; 202/176; 202/181; 202/187; 202/201; 202/237

(58) Field of Classification Search .............. 159/16.1; 202/176, 181, 185.5, 185.6, 187, 201–203, 202/237; 203/10, 22, 27, 39, 42, 49, DIG. 8, 203/DIG. 9
See application file for complete search history.

(56) References Cited

U.S. PATENT DOCUMENTS

| 3,029,068 | A | * | 4/1962 | Skow ................... 165/141 |
| 3,055,810 | A | * | 9/1962 | Skow ...................... 203/2 |
| 3,347,755 | A | | 10/1967 | Brooks |
| 3,565,767 | A | | 2/1971 | Light |
| 3,606,999 | A | * | 9/1971 | Lawless ................. 423/659 |
| 3,843,463 | A | | 10/1974 | Brown |
| 3,860,492 | A | | 1/1975 | Lowl, Jr. et al. |
| 4,127,009 | A | | 11/1978 | Phillips |
| 4,135,984 | A | * | 1/1979 | Kirschmann .............. 202/83 |
| 4,210,494 | A | | 7/1980 | Rhodes |
| 4,247,369 | A | * | 1/1981 | Bean ..................... 202/176 |
| 4,269,664 | A | * | 5/1981 | Younger ................ 202/185.2 |
| 4,548,262 | A | | 10/1985 | Hull |
| 4,595,459 | A | | 6/1986 | Kusakawa et al. |
| 4,882,283 | A | | 11/1989 | Gentry |
| 4,894,123 | A | * | 1/1990 | Helmich ................ 202/176 |
| 4,976,824 | A | | 12/1990 | Lee |
| 5,030,327 | A | | 7/1991 | Lee |
| 5,332,476 | A | | 7/1994 | Lee |
| 5,354,428 | A | * | 10/1994 | Clark et al. ............ 202/154 |
| 5,490,906 | A | | 2/1996 | Lee |
| 6,348,137 | B1 | | 2/2002 | Nommensen |

OTHER PUBLICATIONS

B.J. Huang, A Double-Effect Distillation System Operated at Ambient Pressure, Department of Mechanical Engineering, National Taiwan University, Taipei, Taiwan (Unpublished).

* cited by examiner

*Primary Examiner*—Virginia Manoharan
(74) *Attorney, Agent, or Firm*—Townsend and Townsend and Crew LLP

(57) ABSTRACT

A condensing chamber and a heating chamber are arranged in an enclosure. Liquid is fed into the condensing chamber where it is pre-heated. The pre-heated liquid flows to the heating chamber where it is boiled to produce vapor. Gas sparging in the condensing chamber enhances heat transfer and absorbs additional vapor generated by pre-heating. The condenser is a helical or other horizontal tube heat exchanger.

11 Claims, 2 Drawing Sheets

US 7,504,005 B2

FLUID DISTILLATION APPARATUS HAVING IMPROVED EFFICIENCY

CROSS-REFERENCES TO RELATED APPLICATIONS

This application claims priority to PCT Patent Application No. US2004/015852, filed May 19, 2004, which in turn claims priority to U.S. patent application Ser. No. 10/443,504, filed May 21, 2003, the full disclosures of which are hereby incorporated herein by reference.

BACKGROUND OF THE INVENTION

In U.S. Pat. Nos. 4,976,824; 5,030,327; and 5,332,476, several embodiments of a fluid distillation system are disclosed. For the most part, these embodiments provide effective operation and a reasonable yield of distilled water. However, with improved design of such a system, the operation and yield can be enhanced, and the present invention is directed to apparatus and method for providing an increase in the yield of distilled water from such a system while keeping the system relatively simple in construction.

U.S. Pat. No. 5,490,906 describes several embodiments of a fluid distillation system wherein each embodiment uses a primary container or chamber for water or fluid to be distilled and a secondary water container or chamber. The two chambers are adjacent to each other, and the secondary chamber cooperates with the primary chamber to direct water vapor generated in the system to travel to a reservoir for collection.

An example of such a fluid distillation apparatus was built under the instruction of Naisin Lee, an inventor herein, and is described in an updated manuscript authored by B. J. Huang and available from the National Taiwan University, Taipei, Taiwan, prior to the invention described and claimed herein. The distillation apparatus includes separate heating and condensing chambers where the vapor is condensed in a plurality of vertical chambers.

Thus, it remains desirable to provide further improved distillation apparatus and methods useful for water and other liquids. Such apparatus should preferably be compact, provide highly efficient distillation, i.e. minimum energy input per unit amount of distilled water produced, and be scalable from small units to large units. At least some of these objectives will be met by the inventions described hereinafter.

SUMMARY OF THE INVENTION

The present invention provides improved liquid distillation apparatus and methods. The apparatus can take a variety of forms, but will preferably have a highly compact form which is easily manufacturable at a relatively low cost, as described in more detail below. Apparatus of the present invention permit distillation of water and other liquids to be performed on a highly efficient basis, typically with an energy consumption of 380 kcal/l of water distilled or less, preferably being 320 kcal/l of water distilled or less.

In a first aspect, distillation apparatus according to the present invention comprise an enclosure defining a heating chamber and a condensing chamber. The enclosure is usually a single shell or housing having internal structure for defining the separate chambers, but could less desirably be formed from separate housings or structures joined together by pipes, ducts, and the like. The enclosure defines a vapor space above and common to the heating and condensing chambers and has a liquid feed inlet into the condensing chamber.

A horizontal tube condenser, such as a helical or spiral tube condenser, is disposed in the condensing chamber and has a vapor inlet at an upper end thereof and a clean distal outlet at a lower end thereof. To enhance efficiency, a gas sparger, such as an aerator, is disposed within the condensing chamber to direct air or other gas bubbles upwardly through the condensing chamber. Such bubbles provide two distinct benefits. First, the bubbles scrub the heat transfer surfaces of the condenser to enhance heat transfer. Second, the bubbles absorb vapor directly from the liquid feed which is being heated as the vapor is condensed within the condenser. The vapor in the bubbles is carried upwardly into the vapor space where it combines with the steam vapor from the heating chamber, which will include an electrical or other heating element for boiling the water or other liquid therein.

The combined vapors which collect in the vapor space pass downward through the horizontal tube condenser, where the vapors are condensed by heat exchange with the relatively cold liquid feed, typically cold water, coming into the condensing chamber. After condensing, the clean distillate may be collected from an outlet at the lower end of the condenser.

The high efficiencies achieved by the apparatus and methods of the present invention are believed to be derived, at least in part, from the interaction between the upwardly flowing gas bubbles from the gas sparger and the horizontally arranged heat exchange surfaces of the horizontal tube condenser. In the preferred spiral and other close-packed configurations of the horizontal tub condensers, the bubbles will pass upwardly through multiple tortuous paths where the directional flow is constantly changing and intimate contact between the bubbles and the exposed surfaces of the tube condensers is maintained. The ability to close pack the horizontal tubes is also an advantage since it allows a highly compact distillation unit to be constructed.

In preferred aspects of the apparatus, the enclosure is a cylinder having a vertical axis. The heating chamber comprises a tubular wall arranged coaxially with the vertical axis of the cylindrical enclosure, and the condensing chamber is disposed annularly about the tubular wall of the heating chamber. Thus, the horizontal tube condenser may preferably comprise a coiled tube arranged in the annular condensing chamber, more preferably comprising a plurality of coiled tubes arranged spirally within the condensing chamber and passing from the upper end to the lower end thereof. The plurality of condensing tubes may be joined at the bottom in a manifold or other collection chamber for collecting the clean distillate.

In the preferred constructions, the heating chamber and the condensing chamber will both open at their upper ends into the common vapor space, and the heating chamber will open at its lower end to the condensing chamber to allow the flow of pre-heated liquid from the condensing chamber to the heating chamber. Most simply, the lower end of the condensing chamber will form an open plenum and at least one opening or passage will be provided in the tubular wall of the heating chamber to permit liquid flow. Usually, only a single passage or opening at the lower end will be provided to permit liquid flow between the condensing chamber and the heating chamber. In this way, flow of the inlet liquid must first pass through the condensing chamber before entering the heating chamber. The sparging air or gas may be provided in any conventional manner. Typically, a perforated tube, usually a perforated coiled tube, is disposed in a bottom space or plenum of the condensing chamber to pass the sparging bubbles upwardly therethrough.

In a second aspect, methods of the present invention comprising feeding a liquid feed through a condensing chamber to a heating chamber. The liquid feed is boiled in the heating chamber to form a first vapor phase. Air or other gas is sparged upwardly through condensing chamber to provide a second vapor phase carried upwardly by the gas bubbles. The first vapor and second vapor phase combine and are condensed in a horizontal tube condenser in the condensing chamber. The gas bubbles enhance heat transfer between the inlet liquid feed and the condensing vapor to both enhance condensation and enhance pre-heating of the liquid feed. A clean distillate may then be collected from the bottom of the condenser.

In a third aspect, the present invention provides an improved method for distilling water. The method is of the type where water is boiled to produce steam and the steam is condensed in a condenser by a heat exchange with feed water. The improvement of the present invention comprises sparging the condenser with air to enhance heat transfer and produce additional water vapor which is condensed with the steam. The improvement optionally further comprises condensing the vapor in a horizontal tube heat exchanger. The improved method produces water with a very high distillation efficiency.

The energy consumption per liter of water produced by the methods and apparatus of the present invention is typically below 380 kcal/l, preferably below 320 kcal/l. Such improved methods usually utilize a horizontal tube condenser to provide the benefits discussed above.

DETAILED DESCRIPTION OF THE INVENTION

Figure 1:
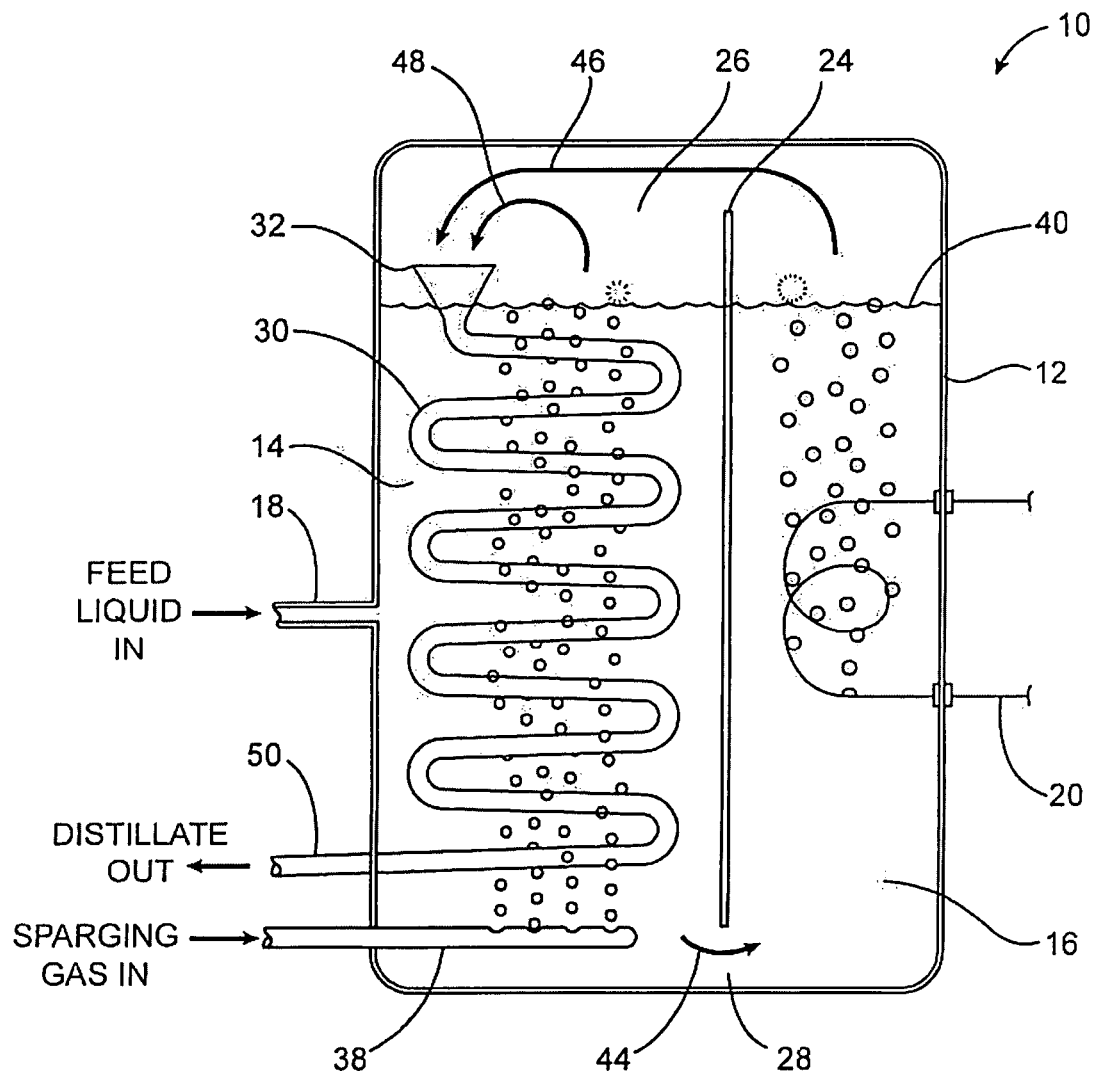
FIG. 1 is a schematic illustration of a distillation apparatus constructed in accordance with the principles of the present invention showing exemplary liquid and gas flows.

Referring to FIG. 1, apparatus 10 according to the present invention comprise an enclosure 12 having at least a condensing chamber 14 and a heating chamber 16 therein. A liquid feed inlet 18 is provided into the condensing chamber 14, and an electrical resistance heating element 20, or other heating element, is provided within the heating chamber 16. The condensing chamber 14 and heating chamber 16 are divided by an internal partition 24 but are generally connected or open at their upper and lower ends to permit an internal flow or movement of liquids and vapors as will be described in more detail below. In particular, a vapor space 26 defined in the upper end of the enclosure 12 and an opening or passage 28 is provided in the lower region of the enclosure.

A horizontal tube condenser 30 is disposed in the condensing chamber 14 and includes a plurality of generally horizontal heat exchange tubes which serve to condense vapor entering from an upper end 32 thereof and to pre-heat the liquid feed inlet entering through inlet 18. The horizontal tube condenser 30 may take a variety of forms and is shown schematically as a generally serpentine structure having a number of reversing flow sections. More usually, however, the condenser will be arranged as a helical coil or spiral, as described in more detail with reference to FIG. 2 below.

An important feature of the present invention is the inclusion of an air or gas sparger 38 at or near the bottom of the condensing chamber 14. Sparging gas is introduced through the sparger 38, and bubbles are generated which pass upwardly through the liquid feed in a direction generally countercurrent to the liquid flow, at least at the bottom of the chamber 14. Since the liquid feed is heated by the vapor flow through the horizontal tube condenser 30, vapor will be generated in the liquid feed which will generally coalesce with the gas bubbles. As the gas bubbles pass upwardly through upper liquid surface 40, the vapor will be released into the vapor space 26, together with vapor from the heating chamber as will be discussed in more detail below. The bubbles also act to enhance the heat transfer between the liquid feed coming in and the vapor passing downwardly through the horizontal tube condenser 30, as discussed above.

The liquid feed, after having been pre-heated in the condenser chamber 14, flows to the heating chamber, generally as indicated by arrow 44. The liquid entering the heating chamber 16 is heated by heating element 20 to cause boiling and vapor generation. The vapor generated in the heating chamber 16 also passes into the vapor space 26 where it combines with the vapor from the sparged gas in the condensing chamber. Thus, vapor from the heating chamber 16, as generally indicated by arrow 46, and vapor from the condensing chamber 14, as generally indicated by arrow 48 pass into the upper end 32 of the horizontal tube condenser 30, where the combined vapors then pass down the tube and are condensed by heat exchange with the liquid feed. The condensed vapor provides a "clean distillate" which may then be collected from outlet 50 of the condenser. An exemplary mass and energy balance is shown below.

| EXEMPLARY MASS AND ENERGY BALANCE | |
|---|---|
| Total volume in enclosure 12 | 6 l |
| Volume in Coils 30 | 3.5 l |
| Volume in Heating Chamber 16 | 1.5 l |
| Surface Area of Coils 30 | 0.9 m$^2$ |
| Water Flow | 4.6 l/hr. |
| Sparging Air Flow | 360 l/hr. |
| Specific Power | 318 kcal/l |
| Condenser Efficiency | 0.2 $\frac{m^2 hr}{l}$ |

Figure 2:
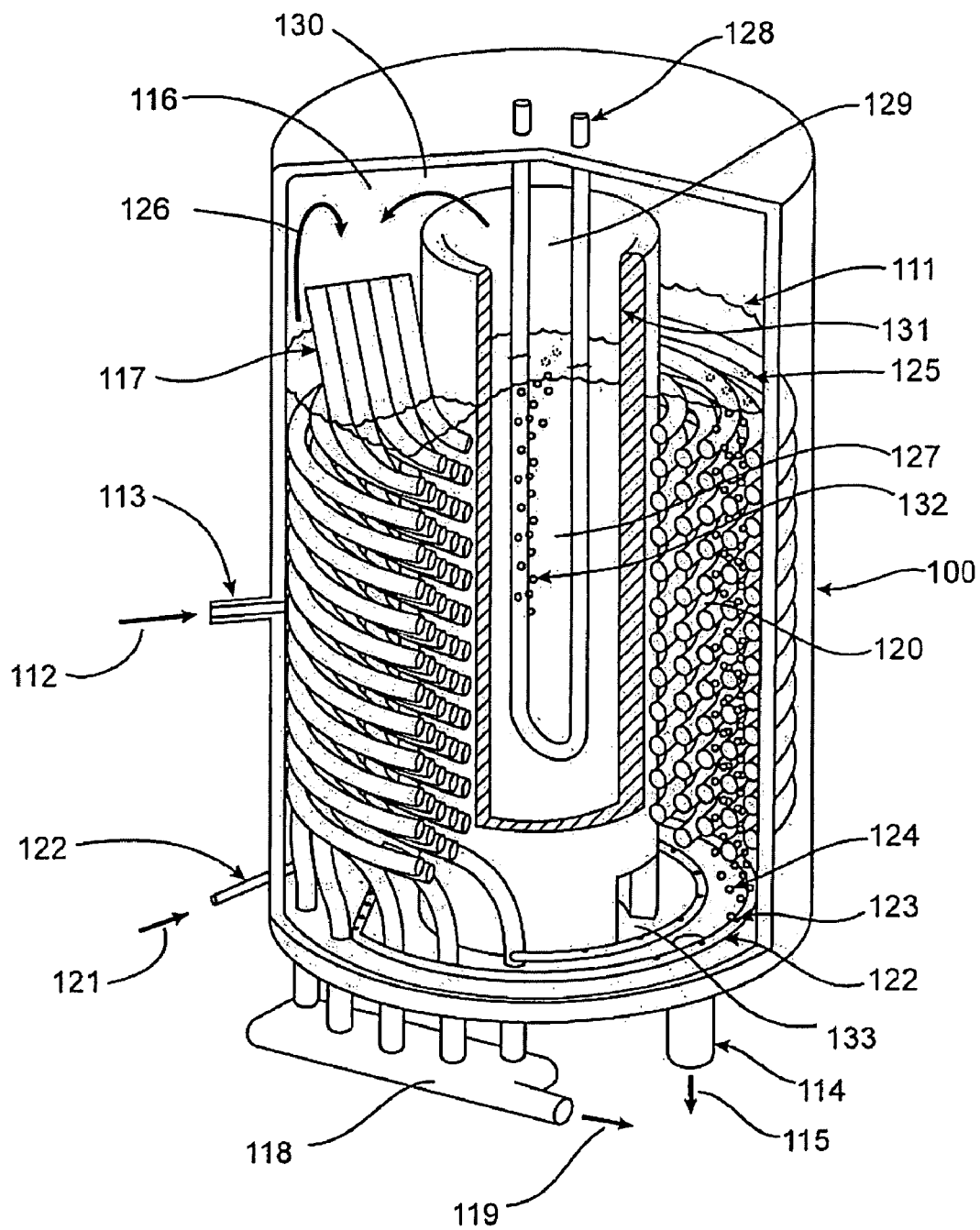
FIG. 2 illustrates a specific embodiment of apparatus constructed in accordance with the principles of the present invention with portions being broken away to illustrate internal components.

Referring now to FIG. 2, a presently preferred embodiment of the distillation apparatus of the present invention will be described. A cylindrical enclosure 100 is adapted to contain water or other liquid at a level 111. Water or other liquid feed to be distilled 112 may be introduced into the enclosure 100 through an inlet 113. The liquid level 111 in the enclosure may be maintained by conventional apparatus, such as level sensors and inlet feed controls (not shown). A drain 114 is provided for periodic removal of brackish condenser liquid which collects at the bottom of the enclosure 100 over time.

A vapor space 116 is formed at an upper end of the interior of enclosure 100 generally over the liquid surface 111. A plurality of spiral condensing tubes 117 (with five being illustrated) are disposed annularly at the outer periphery of the interior of the enclosure 100. While the condensing tubes 117 will typically have a circular cross section, it is possible that the tubes could have other cross sections, such as oval, square, polygonal, or like. It is generally preferred, however, that the coils be arranged so that the tubes are generally horizontal in order to enhance contact with the sparged gas bubbles as generally described above. The spiral tubes 117 are, of course, not truly horizontal and by "horizontal" it is meant only that the tubes will have an angle less than 45° relative to horizontal, usually less than 25°, and more preferably less than 15°. An exemplary angle is in the range from 1.5° to 2.5°.

Vapor from the vapor space 116 will enter into the condensing tubes 117 as indicated by arrows 126 and 130. As the vapor passes downwardly through the condensing tubes 117, heat exchange with the liquid inlet will condense the vapor producing the desired distillate. The distillate is preferably removed through a reservoir or manifold 118 which combines the outflow from each of the condensing tubes 117 and provides a common outlet 119 from which the distillate may be withdrawn.

Gas sparging over the heat exchange tubes 117 preferably provided by gas injection tube 122 having holes 123 which produce bubbles 124. Bubbles pass upwardly through the condensing tubes 117 in an annular condensing chamber 120. For convenience, the bubbles 124 are shown in only a portion of the condensing space. In actual operation, the bubbles would be passing upwardly through the entire annular condensing chamber 120. It will also be appreciated that a wide variety of other gas spargers could be used, including perforated manifolds, porous stones, and the like. It will also be appreciated that the sparging may be done with air (in which case it may be referred to as aeration), or with a wide variety of other gasses.

The heating chamber 127 is defined by a tubular wall 131 surrounding a heating element 128. Water from the condensing chamber 120 passes into the interior of the heating chamber 127 through an opening 133 at the bottom thereof. The heating element 128 produces liquid vapor bubbles 132 which pass upwardly through an upper opening 129 in the heating chamber into the vapor space 116. The vapor then passes into the tops of the condensing tubes, as indicated by arrow 130 and described previously.

Optionally, a fan (not illustrated) or other cooling apparatus will be provided at the bottom of the enclosure 100 to cool the condensate. Further optionally, cooling fins (not shown) or other heat exchange enhancements may be provided to even more efficiently cool the condensate.

In alternate embodiments (not illustrated), the condensate line(s) and/or the gas sparging line(s) may be piped in through the headspace 130 of the enclosure. The remaining aspects of the water and gas circulation, however, will generally remain the same. If the condensate line is brought out through the headspace, an optional fan and/or optional cooling fins may also be provided in the headspace.

It will be appreciated that construction and operation of the distillation apparatus of FIG. 2 is relatively straightforward. In particular, the liquid level in both the condensing chamber 120 and heating chamber 131 will be the same, thus requiring only a single liquid level control system. Heat into the apparatus is provided principally by the amount of energy delivered to the heating element 28. Evaporation of water into the gas bubbles cools the incoming water, and a cooler condenser will condense more vapor. Thus, a colder feed water will be desirable. Humidity of the sparging gas is preferably maintained at a relatively low level, although this will often be difficult to control.

While the above is a complete description of the preferred embodiments of the invention, various alternatives, modifications, and equivalents may be used. Therefore, the above description should not be taken as limiting the scope of the invention which is defined by the appended claims.

What is claimed is:

1. Distillation apparatus comprising:
   an enclosure defining a heating chamber, a condensing chamber, a vapor space above and common to the heating and condensing chambers, and a liquid feed inlet into the condensing chamber, wherein liquid from said feed inlet enters the condensing chamber and is maintained at a level within the condensing chamber;
   a horizontal tube condenser immersed in the liquid feed within the condensing chamber and having a vapor inlet at an upper end thereof and a distillate outlet at a lower end thereof, wherein vapor condensation within the condenser preheats the liquid feed;
   a gas sparger disposed to direct gas bubbles upward through the liquid feed in the condensing chamber, wherein the bubbles scrub heat transfer surfaces of the condenser to improve heat transfer between the liquid and the condenser and absorb vapor from the liquid feed; and
   wherein liquid feed passes through the condensing chamber to the heating chamber and vapor formed in the heating chamber combines with vapor from the gas bubbles in the vapor space and the combined vapors flow through the horizontal tube condenser to condense to produce a distillate,
   wherein the enclosure is cylindrical and has a vertical axis,
   wherein the heating chamber comprises a tubular wall arranged coaxially with the vertical axis of the enclosure, and
   wherein the condensing chamber is disposed annularly about the tubular wall of the heating chamber to form an annular condensing chamber.

2. Distillation apparatus as in claim 1, wherein the horizontal tube condenser comprises a coiled tube arranged in the annular condensing chamber.

3. Distillation apparatus as in claim 2 wherein the horizontal tube condenser comprises a plurality of coiled tubes arranged in the annular condensing chamber.

4. Distillation apparatus as in claim 1, wherein the heating chamber and the condensing chamber are both open at their upper ends into the vapor space.

5. Distillation apparatus as in claim 4 wherein the heating chamber is open to the condensing chamber to allow the flow of preheated liquid from the condensing chamber to the heating chamber.

6. Distillation apparatus as in claim 5, wherein the heating chamber and the condensing chamber are open at their lower ends.

7. Distillation apparatus as in claim 1, wherein the heating chamber and the condensing chamber are open only at their lower ends.

8. Distillation apparatus as in claim 1, wherein the gas sparger comprises a perforated coiled tube disposed in a bottom space of the condensing chamber.

9. A method for distilling a liquid feed, said method comprising:
   feeding the liquid feed through a condensing chamber to a heating chamber;
   boiling the liquid feed in the heating chamber to form a first vapor phase;
   sparging a gas upwardly through the liquid feed in the condensing chamber to produce a second vapor phase in bubbles of the gas, wherein the first and second vapor phases combine in a space above the heating and condensing chambers to produce a combined first and second vapor phases;
   flowing the combined first and second vapor phases through a horizontal tube condenser immersed in the liquid feed in the condensing chamber, wherein the combined first and second vapor phases condense and the gas bubbles scrub heat transfer surfaces of the condenser and enhance heat transfer between the liquid feed and the condensing vapor in the condenser; and collecting distillate from the bottom of the condensers, wherein the liquid feed comprises water, and wherein energy required to distill the water is less than 380 kcal/l.

10. An improved method for distilling water, said method being of the type wherein water is boiled to produce steam and the steam is condensed in tubes of a condenser by heat exchange with feed water, wherein the improvement comprises immersing the tubes in the feed water and sparging the condenser tubes with air to enhance heat transfer and absorb additional water vapor which is condensed with the steam, wherein the improvement heater comprises configuring the condenser and sparging sufficient air to achieve a distillation efficiency of at least 380 kcal/l of water produced or below.

11. An improved method as in claim 10, wherein the improvement further comprises providing the condenser as a horizontal tube condenser.

* * * * *